(No Model.) 2 Sheets—Sheet 1.

A. WICKEY.
COMBINED RAKE AND TEDDER.

No. 392,705. Patented Nov. 13, 1888.

Attest:
Sidney P. Hollingworth.
F. T. Chapman

Inventor.
Andrew Wickey,
By Phil. T. Dodge
Atty.

(No Model.) 2 Sheets—Sheet 2.

A. WICKEY.
COMBINED RAKE AND TEDDER.

No. 392,705. Patented Nov. 13, 1888.

ON LINE X–X g³ ON LINE Y–Y

Attest:
Sidney P. Hollingsworth
A. T. Chapman

Inventor:
Andrew Wickey.
By his Atty
Phil T. Dodge

UNITED STATES PATENT OFFICE.

ANDREW WICKEY, OF QUINCY, ILLINOIS.

COMBINED RAKE AND TEDDER.

SPECIFICATION forming part of Letters Patent No. 392,705, dated November 13, 1888.

Application filed June 23, 1887. Serial No. 242,294. (No model.)

*To all whom it may concern:*

Be it known that I, ANDREW WICKEY, of Quincy, in the county of Adams and State of Illinois, have invented certain Improvements in a Combined Rake and Tedder, of which the following is a specification.

The object of this invention is to so combine and arrange a rake and tedder that the material to be raked will be formed into a continuous windrow and at the same time be acted upon by the tedder; and to this end the invention consists of a rake adapted to discharge the gathered material at one end and a tedder arranged at the discharge end of the rake, whereby the raked material is prevented from clogging and is also teddered.

The invention further consists of a clearing device or devices at the front end of the said rake, means for operating the tedder and clearer, means for adjusting the rake and tedder, and the combinations and constructions hereinafter set forth.

Figure 1:
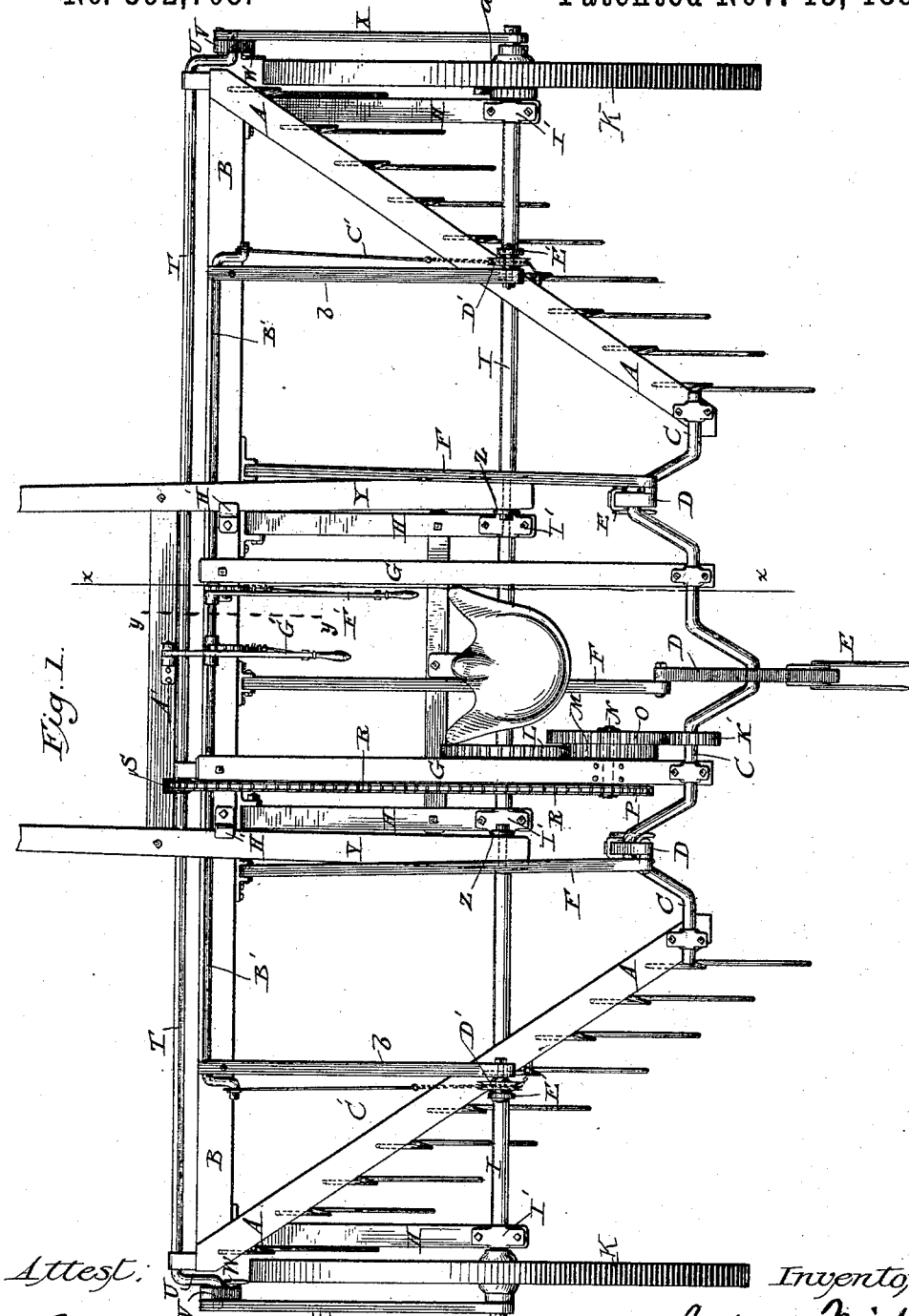
Figure 2:
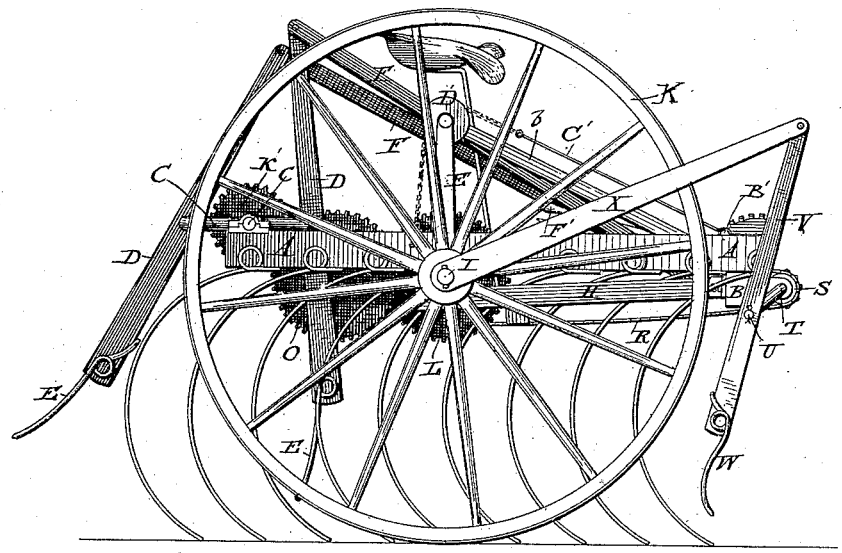
Figure 3:
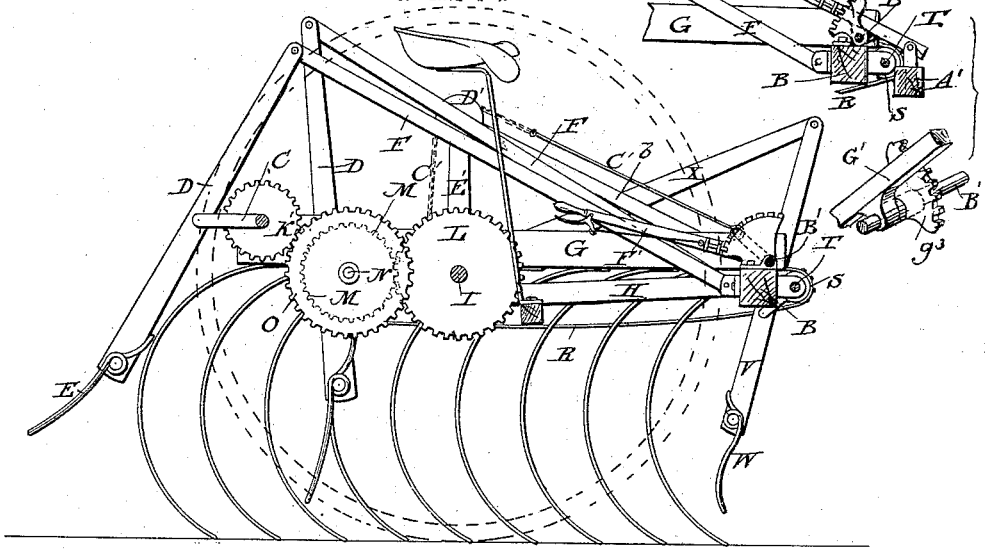
Figure 4:
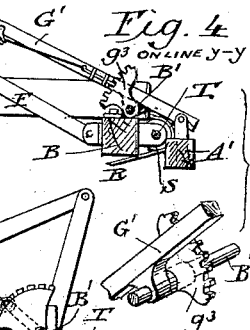

Referring to the drawings, Figure 1 is a plan view of the combined rake and tedder. Fig. 2 is a side elevation of the machine. Fig. 3 is a section on the line $x\ x$ of Fig. 1. Fig. 4 is a section on the line $y\ y$ of Fig. 1.

The rake, as shown, consists of rake-heads A, carrying rake-teeth of any suitable form and construction, and located at the sides of the machine. The rake-heads extend from front to rear at an angle to the line of draft, being wide apart at the front ends and converging toward the rear ends. The front ends of the rake-heads are connected to a cross-piece, B, and on the rear ends are bearings for the ends of a crank-shaft, C.

The tedder may be of any suitable construction, and, as shown, consists of a series of arms, D, supported near the middle by the cranks of the shaft C, and carrying forks E at the lower ends and pivotally connected at the upper ends by links F to the cross-piece B or other part of the machine, whereby the rotation of the said shaft C will impart the requisite movement to the forks E to cause the latter to act upon the raked material.

Near the middle of the machine are timbers G G, secured at their front ends to the cross-piece B, and at their rear ends carrying bearings for the shaft C between the rear ends of the rake-heads A.

Pivotally connected to the cross-piece B are timbers H, extending rearward to near the middle of the machine, and there carrying boxes I', forming bearings for the axle I, on which latter are the supporting-wheels K of the said machine. The axle is preferably so arranged that it will rotate only when the machine is moving forward, one or both wheels being connected to the said axle by a pawl and ratchet, $a$, or any other suitable device adapted to the purpose.

The mechanism for operating the tedder and clearers may be of any suitable construction that will cause the clearers to throw the material forward and cause the tedder to throw the material rearward. In the form shown a gear-wheel, L, is carried by the axle and meshes normally with a pinion, M, on one end of a short shaft, N. The latter is provided with bearings on and projecting beyond each side of one of the timbers G, and the end on which is the pinion M carries a gear-wheel, O, the said gear meshing with a pinion, K', on the shaft C. The other end of the shaft N carries a sprocket-wheel, P, connected by a chain, R, to a sprocket-wheel, S, on a shaft, T, journaled in bearings on the cross-piece B, and having crank-extensions U beyond the ends of the said cross-piece.

It will be observed that the connections above described will rotate the shafts C and T in opposite directions.

The cranks U on the shaft T carry the clearers, consisting of arms V, the lower ends of which are provided with forks W. The upper ends of the arms V are pivotally connected by links X to the axle or other part of the machine, so that when the shaft T is rotated the forks will throw the material forward or in the direction of the travel of the machine, thus preventing the said material from doubling around the forward teeth of the rakes and keeping them clear. Thills Y are secured at the rear ends to ears Z on the boxes I' at the ends of the timbers H, and at the front of the machine are connected by a thill cross-piece, A'.

In bearings on the cross-piece B is journaled a rock-shaft, B', having crank ends, from which to the heads A are chains or similar connections, C', the said chains passing over pulleys D' above the said heads A and mounted on standards E', secured to the axle I, and strengthened by braces $b$, extending to the cross-piece B. The shaft B' is rocked by means of a lever, F', and when the said shaft is moved the cranks at the ends thereof will be carried forward and cause the chains C' to elevate the rear ends of the rake-beams and the tedder.

A hand-lever, G', is pivoted at one end to the cross-bar A' of the thills, and is provided at a point intermediate of its length with a sleeve or collar pivoted loosely around the crank-shaft B'. As the thills remain in a constant position, it follows that the movement of the hand-lever will raise or lower the shaft B' and the bar B, to which it is attached, the bar B in turn raising or lowering the forward ends of the rake-heads A. The lever G' is provided with an ordinary locking-dog adapted to engage a toothed arm, $g^3$, fastened securely to the shaft B', as shown in Fig. 4. When the lever G' is thus locked to the shaft B', moving the lever will turn this shaft, and thereby elevate or lower the rear end of the rake-heads at the same time that it elevates their front ends, whereby the rake-heads are maintained in a horizontal position. When the lever G' is unlocked, the shaft B' may be turned independently by the lever F, so as to adjust the rear end of the rake-heads without changing the position of their forward ends. To guide the forward part of the frame to prevent lateral movement of the frame when being elevated and to limit its downward movement, I provide brackets H', secured to the cross-piece B at the sides of the thills Y, the said brackets each having a lip or projection at the upper end adapted to engage the upper surface of the thill and limit the downward movement of the said cross-piece. When the frame which carries the rake and tedder is elevated, the pinion M will be lifted away from and out of contact with the gear L, thus preventing the tedder and clearer from operating when the machine is being moved from place to place.

I do not confine myself to the exact arrangement and construction of parts shown, as the same may be changed without departing from the spirit of the invention. For example, other forms of rakes and tedders may be used, and a single rake-beam with a tedder at the discharge end may be employed, it only being necessary that the rake gather the material and deliver it continuously in the shape of a windrow to the tedder, which latter prevents the raked material from clogging the said rake and choking the delivery end thereof. Other means for clearing the front of the rake or rakes may be used, as the object of the clearer is to prevent the material to be raked from folding around the front of the said rake, thus adapting the machine to rake a wider space than it otherwise would. Other means of adjusting the rake-frame may be used, as its purpose is to facilitate transportation.

Having thus described my invention, what I claim is—

1. In a combined rake and tedder, the combination, with a rake delivering the gathered material from one end, of a tedder located at the said delivery end of the rake, substantially as and for the purpose specified.

2. In a combined rake and tedder, the combination, with a rake having two converging heads and provided with an outlet for the gathered material, of a tedder located at the said outlet, substantially as and for the purpose specified.

3. In a combined rake and tedder, the combination, with a rake delivering the gathered material from one end, of a tedder located at the said delivery end, and a clearer located at the other end of the rake, substantially as and for the purpose specified.

4. In a combined rake and tedder, the combination, with a rake delivering the gathered material from one end, of a rotatable shaft located at the other end of the rake, and clearers mounted on said shaft and constructed to throw the material in the direction of the line of draft, substantially as and for the purpose specified.

5. In a combined rake and tedder, the combination, with a rake discharging the gathered material from one end, of a tedder located at the said end and constructed to throw the said material rearward from the machine, and a clearer at the other end of the rake constructed to throw the material in the direction of the line of draft, substantially as and for the purpose specified.

6. In a combined rake and tedder, the combination of the rake having two converging heads, the tedder-shaft supported between the rear ends of the rake-heads, and the clearer-shaft supported at the front of the rake with a clearer at each end, and connections whereby the tedder and clearer shafts are rotated in opposite directions, substantially as and for the purpose specified.

7. In a combined rake and tedder, the combination, with the thill-frame, the adjustable rake and tedder frame, of a rock-shaft journaled on the front of the rake and tedder frame, connections from said shaft to the rear of the rake and tedder frame, and a lever fulcrumed on the thill-frame and loosely embracing said shaft, a segmental ratchet fixed to said shaft, a dog on said lever to engage said ratchet, whereby the front and rear of the said frame may be adjusted simultaneously or the front portion independently, substantially as described.

In testimony whereof I hereunto set my hand, this 21st day of April, 1887, in the presence of two attesting witnesses.

ANDREW WICKEY.

Witnesses:
JAMES F. CARROTT,
ALFRED J. BROCKSCHMIDT.